(12) United States Patent
Billarant

(10) Patent No.: US 7,959,213 B2
(45) Date of Patent: Jun. 14, 2011

(54) DOOR PANEL WITH SELF-GRIPPING HOOKS

(75) Inventor: Fabrice Billarant, Nantes (FR)

(73) Assignee: APLIX, Paris (FR)

( * ) Notice: Subject to any disclaimer, the term of this patent is extended or adjusted under 35 U.S.C. 154(b) by 475 days.

(21) Appl. No.: 12/221,305

(22) Filed: Jul. 31, 2008

(65) Prior Publication Data

US 2009/0026788 A1    Jan. 29, 2009

Related U.S. Application Data

(63) Continuation-in-part of application No. 10/963,958, filed on Oct. 12, 2004, now abandoned.

(30) Foreign Application Priority Data

Oct. 29, 2003   (FR) ...................................... 03 12639

(51) Int. Cl.
*B60J 5/00*        (2006.01)

(52) U.S. Cl. ................... 296/146.7; 296/39.3

(58) Field of Classification Search ............... 296/146.7, 296/39.1, 1.08, 146.1, 152, 39.3; 49/502
See application file for complete search history.

(56) References Cited

U.S. PATENT DOCUMENTS

| | | | |
|---|---|---|---|
| 5,050,351 A | * | 9/1991 | Goldbach et al. |
| 5,482,343 A | | 1/1996 | Bradac .......................... 296/39.1 |
| 7,059,658 B2 | | 6/2006 | Ziegler et al. .............. 296/146.7 |

FOREIGN PATENT DOCUMENTS

| | | |
|---|---|---|
| FR | 2 837 156 | 9/2003 |
| GB | 1 209 413 | 10/1970 |
| JP | 58177744 | 10/1983 |

* cited by examiner

*Primary Examiner* — Stephen Gordon

(74) *Attorney, Agent, or Firm* — Renner, Kenner, Greive, Bobak, Taylor & Weber

(57) ABSTRACT

Door panel assembly of an automobile, having a door panel 1 and a sound-insulating sheet 4 attached to the door panel, characterised in that the door panel has hooks on its surface to which the sound-insulating sheet is attached, and a looped knitted fabric or a looped non-woven fabric 6' is attached to the surface of the sound-insulating sheet to be attached to the panel, the looped knitted or non-woven fabric weighing between 15 and 60 g/m², preferably between 15 and 40 g/m².

10 Claims, 3 Drawing Sheets

DOOR PANEL WITH SELF-GRIPPING HOOKS

CROSS-REFERENCE TO RELATED APPLICATION

This application is a continuation in part of and claims the benefit of U.S. patent application Ser. No. 10/963,958 filed Oct. 12, 2004, and now abandoned.

BACKGROUND OF THE INVENTION

1. Field of the Invention

The present invention relates to body panels for automobiles, in particular door panels on which is fixed a sheet having sound-insulating properties.

2. Description of the Related Art

In current panels, attachment is carried out by fusing synthetic material pins which are inserted into a housing of the door panel and which are made by means of an injection process, by ultrasonic welding of compatible materials, or by a process using adhesive, in particular using hot melt adhesive points.

These techniques are long and troublesome, in particular owing to the point-wise application and owing to the fact that these techniques have to be carried out in two stages, the first stage being the positioning in the panel and the second stage being its attachment to the panel.

Furthermore, once the sound-insulating sheet is fixed, its position can no longer be modified such that it is necessary to provide complex tooling to ensure that the sheet is fixed in the correct position when it is first placed.

Finally, the presence of numerous weld or adhesive points within the sound-insulating sheet itself has a disadvantageous effect on its air flow resistance characteristic, and thus reduces its sound-insulating properties.

SUMMARY OF THE INVENTION

The present invention aims to create a door panel assembly, wherein it is simple and quick to attach (in particular in a single step) a sound-insulating sheet, generally in the form of a felt, a foam or a non-woven fabric, and in particular wherein the sound-insulating sheet is guaranteed to be correctly positioned at the end of the attachment step without having to provide complex tooling or having to repeat a long and troublesome attachment process, in particular by means of local application in numerous points on the sound-insulating sheet/panel interface, and the sound-insulating quality also being improved.

In accordance with the invention, a door panel assembly of an automobile, having a door panel and a sound-insulating sheet attached to the door panel, is characterised in that the door panel has hooks on its surface facing the sound-insulating sheet and a looped knitted fabric or a looped non-woven fabric is attached to the surface of the sound-insulating sheet facing the panel, the looped knitted or non-woven fabric weighing between 15 and 60 g/m$^2$, preferably between 15 and 40 g/m$^2$.

By thus providing a system with hooks and a looped knitted or non-woven fabric, a system is obtained which is particularly simple for the quick, firm attachment of the sound-insulating sheet, in the correct position, to the door panel, whilst furthermore providing improved sound-insulating properties with respect to the Prior Art.

In accordance with a preferred embodiment, the hooks issue from one part of the door panel, the hooks being produced in particular by an injection moulding process.

In accordance with a preferred embodiment, the sound-insulating sheet is a felt, in particular weighing between 40 and 500 g/m$^2$.

In accordance with a preferred embodiment, the sound-insulating sheet is a foam, the sheet being attached to the looped knitted or non-woven fabric in particular by means of a foaming process.

In accordance with a preferred embodiment, the panel surface intended to receive the sheet has hooks disposed on small regions, preferably from 1 to 5 cm$^2$, mutually spaced apart, in particular in a regular manner, in particular in a ratio of 5 to 25 per m$^2$ of the panel.

The foaming process consists of melting the foam to attach it to the knitted fabric.

The present invention also relates to a laminated structure forming the sound-insulating sheet, comprising a sound-insulating sheet, in particular of foam, non-woven fabric or felt, and weighing in particular between 40 and 500 g/m$^2$, characterised by a looped knitted or non-woven fabric which is attached, in particular by means of adhesive, a foaming process or other method, to the sound-insulating sheet, in particular over the whole of one side of the sheet, the looped knitted or non-woven fabric weighing between 15 and 60 g/m$^2$, preferably between 15 and 40 g/m$^2$.

BRIEF DESCRIPTION OF THE DRAWINGS

One embodiment of the invention is shown in the drawings which are given by way of example only and in which.

DETAILED DESCRIPTION OF THE INVENTION

Figure 1:
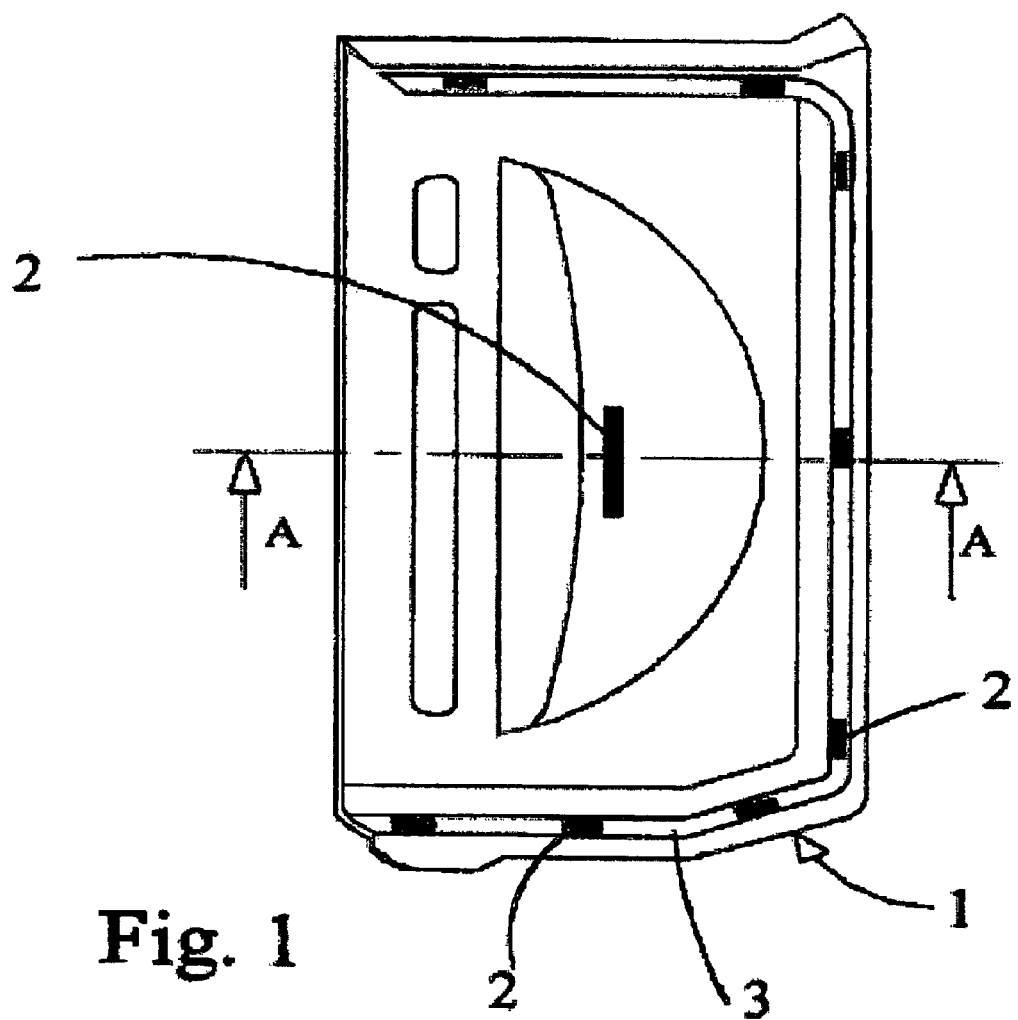
FIG. 1 schematically shows a view of a door panel in accordance with the invention.
Figure 2:
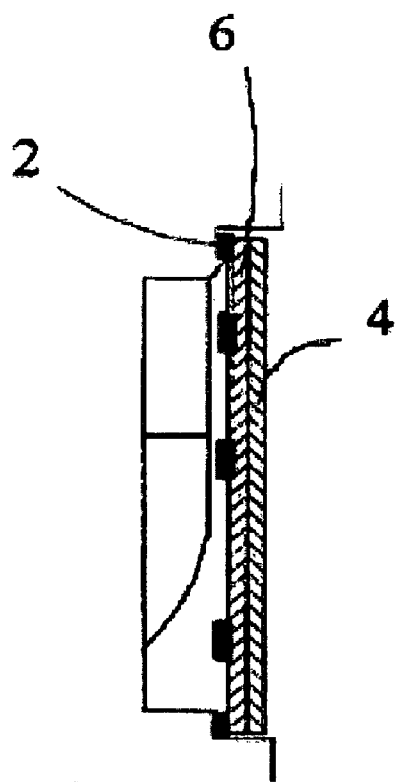
FIG. 2 shows a cross-sectional view taken along line A-A of the panel of FIG. 1 to which a laminated structure forming the sound-insulating sheet is attached.
Figure 3:
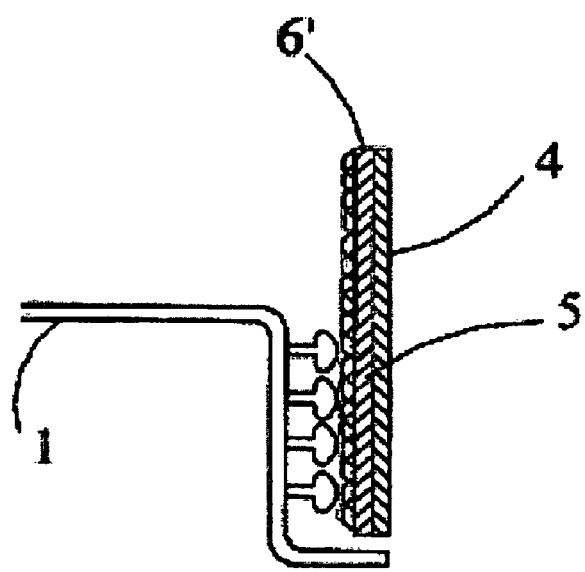
FIG. 3 shows a part of FIG. 2 in a larger scale, and FIG. 4 schematically shows a door of a vehicle.

With reference to the Figures, the door panel assembly of an automobile comprises a panel 1, in particular of synthetic material for example, having a surface 3 with hooks 2 which issue therefrom and are formed by an injection moulding process. A method for producing a panel having moulded hooks of this type is described in particular in European Patent no. 0577697 in the name of Aircast Inc.

The hooks 2 may also be produced separately, e.g. in the form of a batt of hooks which is subsequently attached by means of adhesive to the panel.

In accordance with a preferred alternative embodiment, the surface 3 comprises a network of small hooked regions, preferably from 1 to 5 cm$^2$, mutually spaced apart in a ratio of 5 to 25 per m$^2$ of the panel, in particular following a regular arrangement.

The panel assembly also comprises a sound-insulating sheet assembly. This sheet assembly is formed from a sheet 4 of sound-insulating material, for example of PETON PP, in the form of a non-woven fabric. The sheet 4 can also be a felt or a foam. The sheet 4 weighs between 40 and 500 g/m$^2$, in particular between 60 g/m$^2$ and 200 g/m$^2$.

A looped knitted fabric 6, for example comprising an interlacing of weft threads, wale threads and looped threads, is laminated onto a surface 5 of the sound-insulating sheet 4.

The knitted fabric weighs between 15 g/m² and 60 g/m², in particular between 15 and 40 g/m².

This adhesion process can be effected in particular in accordance with the method described in French Patent no. 96 082 59 in the name of the Applicant or by any other well known adhesion, welding, melting, or other, process.

In accordance with another embodiment, a looped non-woven fabric 6', or plush loop, is attached by means of adhesive to the surface 5 of the sheet 4.

The looped non-woven fabric weighs between 15 and 60 g/m², preferably between 15 and 40 g/m².

Preferably, the whole of the surface 5 is covered by the knitted fabric 6 or the non-woven fabric 6', or a combination of the two.

The hooks have a height h which measures in particular between 0.3 and 3.5 mm.

Figure 4:
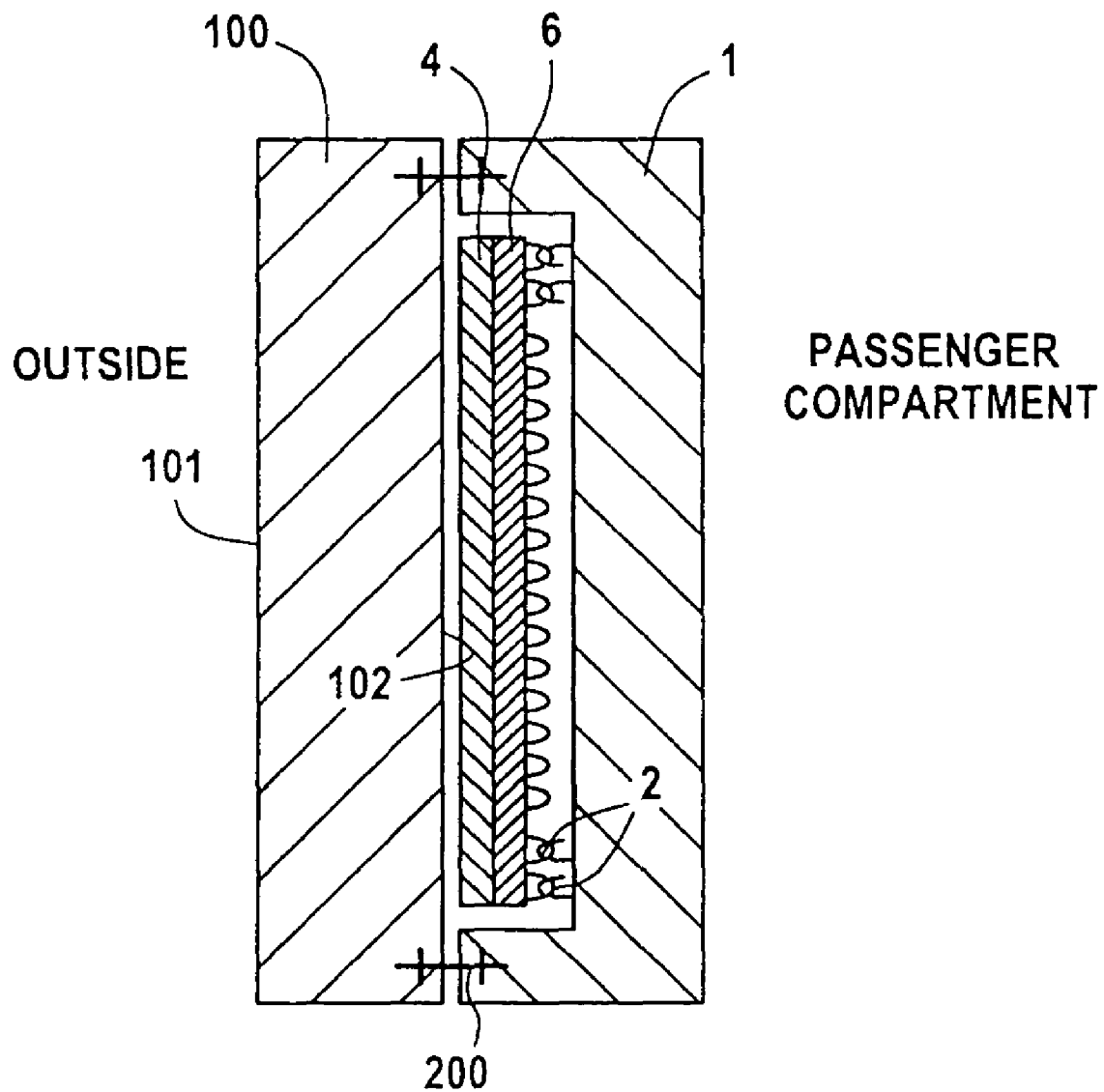

A schematic representation of a door of an vehicle is shown in FIG. 4. The door includes a door body 100, for example made of metal, having an external side 101 which is painted and finished so as to resist as much as possible to outside aggression (weather, water projections, and the like) and an internal side 102 which is turned toward the interior of the passenger compartment of the vehicle. The door body 100 is fixed to the door panel 1 by conventional means, such as screws 200. Furthermore, between the door body 100 and the door panel 1, there is provided the sound insulating sheet 4, which is fixated to the panel 1 by the cooperation of hooks 2 protruding from the external side of said door panel 1, the hooks being integral with said panel, and of loops protruding from the internal side of said sheet 4. The loops are provided by a looped fabric, for example a looped knitted fabric 6 or a looped non woven fabric 6', which is laminated on the internal side of said sheet 4, the fixation of the fabric to the sheet being made by an adhesive or by thermo bonding or analogous art. Preferably, the sheet 4 is totally covered by the fabric.

The sound insulating sheet is a flexible sheet which can adapt itself to the contour of any surface on which it is disposed. When the sheet is disposed on a flat and planar horizontal surface, the sheet is flat and planar (this apply also to the laminate consisting of the sheet and the fabric).

The fixation of the sound insulating sheet 4 to the door panel 1 is made by the cooperation of the hook with the loops.

The invention claimed is:

1. A door for a vehicle comprising a door body having an external side and an internal side, a door panel having an external side and an internal side, said door panel external side being fixed to said door body internal side, and a sound insulating sheet in the form of a non woven fabric being fixed to said door panel external side, hooks protruding from said door panel external side for fixation of the sound insulating sheet by cooperation with loops protruding from said non woven fabric.

2. The door of claim 1, wherein said loops are part of a looped nonwoven fabric.

3. The door of claim 1, wherein said insulating sheet is flat.

4. The door of claim 2, wherein said insulating sheet is flat.

5. The door of claim 3, wherein said insulating sheet is planar.

6. The door of claim 4, wherein said insulating sheet is planar.

7. The door of claim 1, wherein said hooks protrude from one part of the door panel, said hooks being produced by means of an injection molding process.

8. The door of claim 1, wherein said door panel external side includes said hooks being disposed over small regions.

9. The door of claim 8, wherein said small regions are spaced apart at a ratio of between 5 to 25 regions of hooks per square meter of the panel.

10. The door of claim 1, wherein said hooks have a height of between approximately 0.3 and 3.5 mm.

\* \* \* \* \*